Aug. 5, 1952     B. MARTIN     2,605,700
STENCIL DECORATING MACHINE
Filed May 6, 1949     8 Sheets-Sheet 1

Fig. 1

INVENTOR.
Bradford Martin
BY
Wood, Avey, Herron & Evans
ATTORNEYS.

B. MARTIN 2,605,700

STENCIL DECORATING MACHINE

Filed May 6, 1949

INVENTOR.
Bradford Martin
BY
Wood, Arey, Herron & Evans
ATTORNEYS.

Fig. 6

Aug. 5, 1952      B. MARTIN      2,605,700
STENCIL DECORATING MACHINE
Filed May 6, 1949      8 Sheets-Sheet 6

Fig. 7

INVENTOR.
Bradford Martin
BY
Wood, Arey, Herron & Evans
ATTORNEYS.

INVENTOR.
Bradford Martin
BY
Wood, Arey, Herron & Evans
ATTORNEYS.

Patented Aug. 5, 1952

2,605,700

UNITED STATES PATENT OFFICE 2,605,700

STENCIL DECORATING MACHINE

Bradford Martin, Washington, Pa., assignor to Solar Engineering & Equipment Company, Beaver, Pa., a corporation of Pennsylvania Application May 6, 1949, Serial No. 91,710

7 Claims. (Cl. 101—123)

This invention relates to an improved machine for marking or printing the surface of relatively flat or concave ware and particularly for applying designs or figures upon dinner plates, saucers and similar ware by pressing a pigment or paint through a stationary stencil screen upon the ware surface by a moving squeegee, with the ware clamped in a stationary position.

The principal objects have been to provide an automatic machine which performs successive stencilling operations at a high production rate, to provide a structure for stretching the stencil screen tautly over a concave ware surface with the ware and screen fixed against relative movements during passage of the squeegee so as to produce clear sharp impressions, and to provide an automatic interlock to prevent damage to the screen if a ware piece is omitted from the machine during one or several cycles of operation.

Stencil screens for this work are thin membranes of silk or other fragile material mounted in frames and having design areas for passage of the pigment, the screen being stretched tautly over the ware surface and the pigment deposited by the wiping action of the squeegee in passing over the stencil. As applied to table ware and similar ceramic products, the pigment may be a pulverized composition of ceramic material adapted to be fused into the surface of the ware by firing the ware after the stencilling operation. The pigment for other than ceramic or vitreous articles may be any self drying medium appropriate to the ware material.

In the decorating operation, the stencil and ware must be held in fixed relationship so that there is no smudging of the design due to relative movement between the screen and ware as the squeegee wipes across the stencil. Also, by reason of the fragile nature of the stencil screen, it is essential that the screen be supported by the ware surface over which it is stretched. If the squeegee presses upon the unsupported stencil screen, it usually stretches the screen badly, damages it so that it can no longer be used or else the squeegee actually destroys the stencil by tearing it from its frame.

When multicolor decorations are applied to the ware, the several colors are applied one after another at separate operations by the use of a different screen for each color. The ware necessarily must be brought into accurate registry with the stencil screen so that the successive designs may be in accurate registry with respect to each other.

The present machine operates continuously through successive cycles of operation, first to centralize and clamp the ware piece accurately in registry with the stencil, press the ware against the stencil, then to pass a squeegee over the superposed stencil and ware and finally to raise the squeegee and lower the ware from the screen for removal from the machine at the end of the cycle. Briefly, the apparatus constitutes a vertically movable chuck having jaws to center the ware piece, a stationary stencil screen located above the chuck and a vertically movable squeegee assembly poised above the screen. During each cycle the chuck and ware piece are elevated into engagement with the stencil, a pressure plate engages the upper surface of the screen and ware to stretch the screen over the concave face of the ware, the centering jaws move into contact with the periphery of the ware piece to centralize it with the stencil decorations, the squeegee is lowered into pressure engagement against the stencil screen, then swept in an orbit over the face of the stencil to force the pigment through the stencil decorations for deposit upon the ware piece. The ware pieces preferably are fed into the machine by hand but, if desired, an automatic loader can be utilized for this purpose. The machine incorporates a safety arrangement which locks the squeegee assembly in an elevated position should a ware piece be omitted from the chuck so that the squeegee cannot contact the screen and damage it.

In stencilling dinner plates and other ware having a concave surface, it is difficult to place the stencil screen, which is normally flat, into intimate contact with the concave surface. For this purpose there is provided a spring loaded plate engaging the upper surface of the screen which presses the center area of the screen down, bowing or stretching it to a cone-shape conforming substantially to the concave face of the ware piece. When the ware piece is raised into engagement with the screen, the screen nests into the ware, with the screen stretched snugly across the converging face of the piece. In order to prevent smudging, the pressure plate also clamps the ware and screen together unitarily and presses the ware against the nonrotatable chuck to hold the ware stationary during the printing sweep of the squeegee. After printing, the ware is lowered in a straight line from the stencil to avoid smudging as it disengages the stencil.

Making the stencil screen conform to a concave ware surface by a pressure responsive backing plate adapts the machine to any reasonably concave ware contour. In practice, it is expedient to provide a chuck block to support the ware made from non-metallic material such as wood, to form a recessed ware seat mounted on the chuck. The pressure plate for bowing the screen also is made of wood. These parts are replaceable so that they can be made up in sets according to the peculiar requirements of various ware shapes and sizes. The recessed chuck block is slightly smaller than the ware diameter so that the ware overhangs the block for engagement by the centering jaws. Thus, the operator places the ware in partially centered position upon the recessed block and final centering is accomplished by the jaws.

The pressure plate not only nests the screen into the ware but also clamps the stencil and ware firmly, permitting the centering jaws to retract out of the path of squeegee swing during stencilling. Otherwise stated, the stencil and ware are clamped together centrally and the squeegee travels around the uninterrupted margin of the ware. The same structure can be utilized for flat ware or convex ware by adjusting the machine to raise the ware to or above the normal plane of the screen so as to stretch the screen over the ware instead of into it.

A further object has been to provide an arrangement by which the chuck and centering jaws are actuated and the squeegee raised and lowered by cams driven from a common shaft, combined with a simplified driving arrangement for sweeping the squeegee intermittently through a printing stroke when it is lowered upon the squeegee in synchronism with the operation of the chuck and centering jaws.

Further objects and advantages will be apparent from the detailed description of a preferred embodiment of the machine as disclosed in the drawings, so that those skilled in the art will comprehend readily the various modifications of which the apparatus is capable.

General structure and operation

Figure 1:
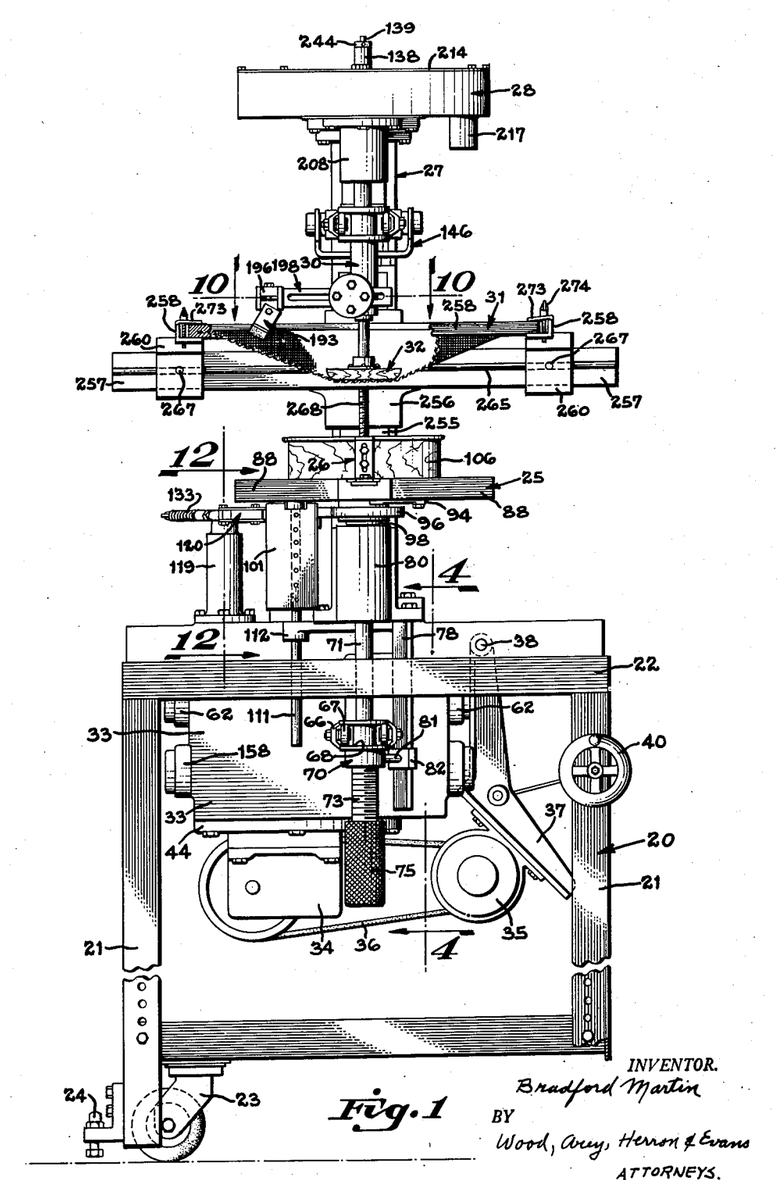
Figure 1 is a general front elevation of the machine with the parts shown in position at the beginning of a working cycle, the stencil screen being partially broken away to illustrate the relationship of the pressure disk and squeegee relative to the screen.
Figure 2:
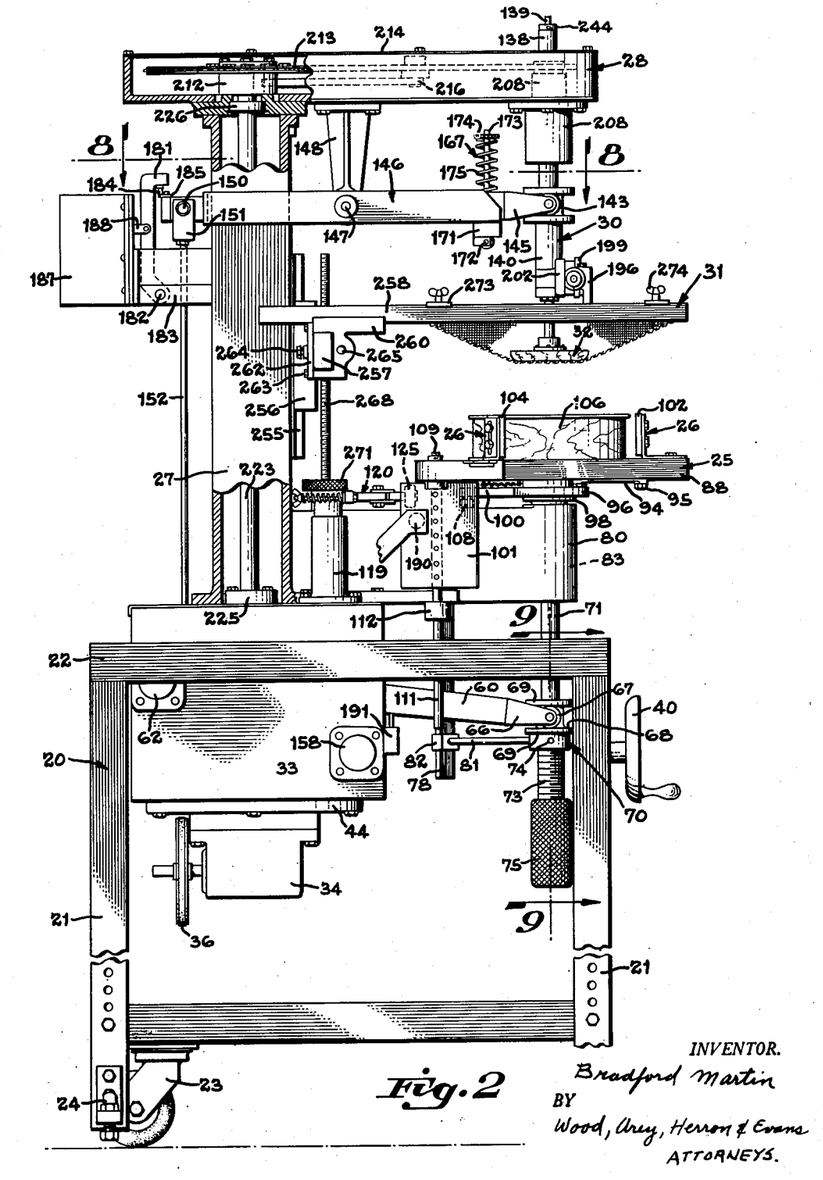
Figure 2 is a side elevation of the machine with the parts in the same position as in Figure 1 and with the interlock latch for the squeegee arm shown in a latching position.

As shown in Figures 1 and 2, the machine generally constitutes an angle iron base frame 20 having legs 21, and a top frame 22 upon which is mounted the operating parts of the machine. The lower ends of the legs 21 include casters 23 and jack screws 24 to anchor the machine and if necessary, to adjust it to a level position.

Mounted upon the base is a vertically movable chuck assembly indicated generally at 25, having movable jaws 26 engageable with the ware to center it upon the chuck relative to the screen and squeegee. A column 27 rises vertically from the rear of the base and includes a horizontal arm 28 overhanging the chuck and supporting a vertically movable squeegee assembly 30. A stencil unit 31 is mounted upon column 27 between the squeegee assembly and chuck in position to be interposed between the squeegee and ware when the chuck rises to its stencilling position. Arm 28 also supports a spring loaded pressure disk 32 adapted to press the stencil yieldably against the face of the ware and to clamp the ware piece by frictional engagement of the pressure plate 32 against the ware, with the chuck jaws 26 withdrawn so as not to interfere with the operation of the squeegee, as hereinafter described.

The moving parts of the machine are actuated in timed relationship with one another by means of a series of cams mounted upon and driven by a common cam shaft which is journalled in the cam housing 33 mounted upon the base of the machine. The structural details of the cam unit is disclosed most clearly in Figures 4 and 5. Mounted upon the underside of the cam housing (Figures 1 and 2) is a speed reducing unit 34 forming a part of a standard Reeves transmission system. The system constitutes a motor 35 in driving connection with the speed reducer 34 by variable speed pulleys, connected by a V-belt 36. The motor is mounted upon an adjustable hanger 37 pivotally mounted as at 38 so as to permit the motor to be shifted toward or away from the speed reducer 34 by operation of a hand wheel 40, connected with the hanger 37. Operation of the hand wheel changes the diameters of the Reeves pulleys so as to vary the operating speed of the machine. A detailed description is omitted since the system is a commercial one.

The machine is designed particularly for decorating concave or flat ware pieces such as dinner plates, soup plates, saucers and the like and operates continuously, the work pieces being fed into the machine preferably by hand. In operation, the ware piece is placed upon the chuck 25 when the chuck is in its lowered position as shown in Figures 1 and 2. At this point in the cycle, the jaws 26 are open to receive and center the work. The chuck assembly then rises and the jaws move toward each other to center the work upon the chuck so that the decorations on the stencil are in accurate registry with the circumference of the ware. The spring loaded pressure disk 32 contacts the upper surface of the stencil at its central area to bow the stencil somewhat into a cone shape to nest into the concave upper face of the work and to clamp the work against the chuck. The central area of the stencil engaged by the disk contacts ware in advance of the squeegee as the chuck assembly rises since the normal position of the pressure plate is considerably lower than the operating edge of the squeegee. Also, the squeegee does not descend until clamping engagement is established between pressure disk and ware before descent of the squeegee assembly, the centering jaws 26 move inwardly toward each other to center the ware with respect to the stencil so that the stencil decorations are accurately aligned with the circumference of the plate. The jaws then retract to a normal position, clear of the periphery of the ware to permit the stencil squeegee to swing in an arc around the ware in a wiping engagement with the stencil without interference by the jaws. After the stencilling operation is completed, the stencil assembly rises out of engagement with the ware and the chuck assembly descends to its lowered position for the next cycle of operation. At this point the operator removes the stencilled ware and places the next piece upon the chuck.

In order to prevent damage to the stencil screen, there is provided an electrical interlock between the chuck jaws 26 and the mechanism for raising and lowering the stencil assembly. When the machine runs through its cycle with a ware piece omitted from the chuck, the jaws 26 will move inwardly beyond the position assumed when the movement of the jaws is impeded by the ware. This overrun closes a safety switch which energizes an interlocking circuit to a solenoid which latches the squeegee assembly in elevated position to prevent the squeegee from contacting the stencil screen and thus to prevent damage to the screen. The machine will continue to operate in this condition until the chuck jaws again encounter a ware piece at which time the normal operation of the stencil and squeegee will be resumed. The details of the safety apparatus will be disclosed in detail at a later point in the specification.

Driving apparatus

Figure 4:
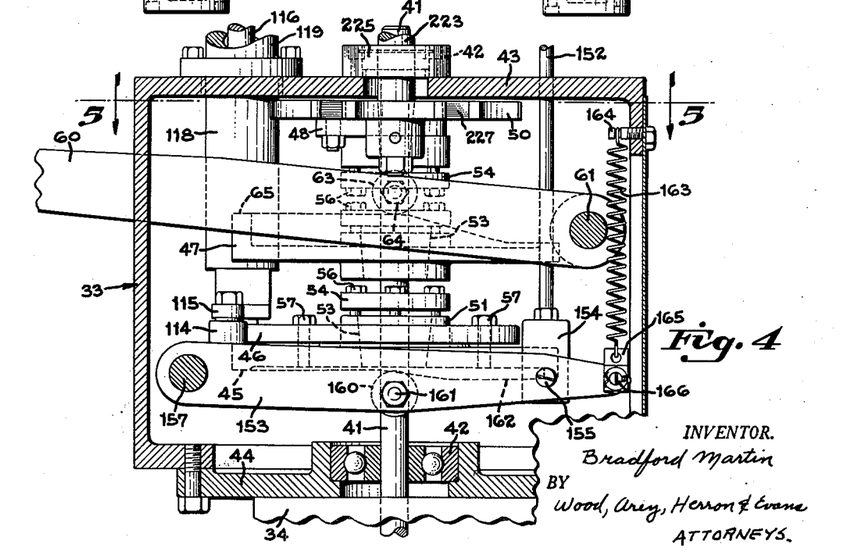
Figure 4 is a sectional view taken on line 4—4, Figure 1, detailing the cam unit with the cams and associated levers in operating positions corresponding to the relationship of the parts shown in Figure 3.
Figure 5:
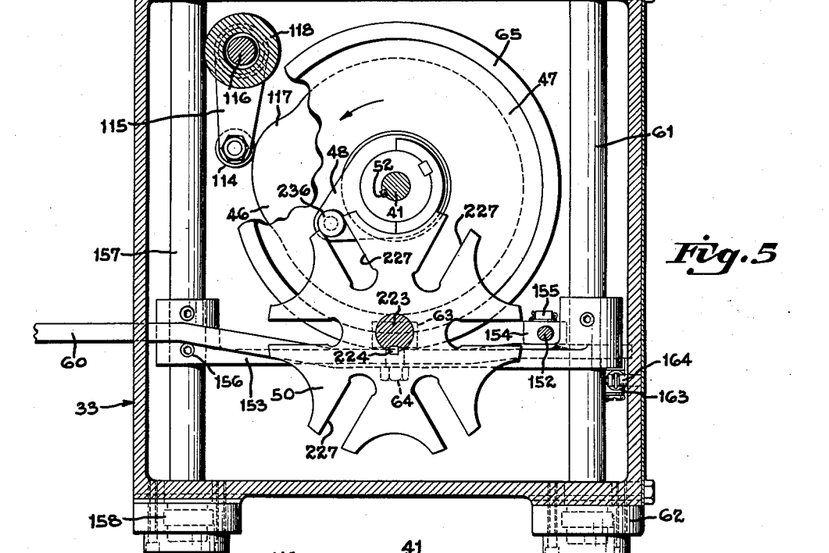
Figure 5 is a sectional view taken on line 5—5, Figure 4, further detailing the structure of the cam unit and illustrating the intermittent driving mechanism for the squeegee.

The various moving parts of the machine are operated in timed relationship with each other by means of a series of cams and a Geneva arm and gear mounted within the cam housing 33. As best shown in Figures 4 and 5, the several cams are mounted in fixed relationship with each other upon a vertical cam shaft 41, driven from the speed reducer unit 34, cam shaft 41 being rotatably journalled in bearings 42—42 mounted in the upper and lower walls 43 and 44 of housing 33. As indicated, there is provided a cam 45 for raising and lowering the squeegee assembly, a cam 46 for operating the chuck jaws 26, a cam 47 for raising and lowering the chuck assembly 25, and a Geneva arm 48 for driving a Geneva gear 50. Each intermittent advancement of the Geneva gear 50 rotates the squeegee through one cycle of revolution when the squeegee and ware are in engagement with the stencil screen as hereinafter described.

In order to synchronize the operations, the cams and Geneva arm are adjustably mounted upon the cam shaft. The mounting structure may follow any preferred design. In the form disclosed, the cams and arm are adjustably fixed to the cam shaft 41 by coupling sleeves 51 which are keyed as at 52 to shaft 41. The coupling sleeves each include a tapered shank 53 frictionally engaged in a tapered bore formed in the respective cams and Geneva arm. The sleeves also include a head 54 having arcuate slots similar to those shown in Figure 6, with mounting screws 56 passing through the slots into screwthreaded engagement with the respective cams. By loosening the screws, the cams may be adjusted relative to each other to time the operating parts of the machine for proper coordination. It will be noted in Figure 4 that cam 45 is secured to cam 46 by means of screws 57 screwthreaded into cam 45 and passing through arcuate slots of cam 46. By this arrangement, both cams are mounted upon a single coupling sleeve but are adjustable with respect to each other.

Chuck assembly

Figure 9:
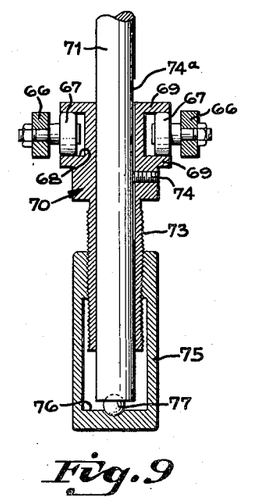
Figure 9 is a sectional view taken on line 9—9, Figure 2, detailing the stroke adjustment device by which the elevation of the chuck assembly may be regulated to accommodate various ware sizes.

The chuck assembly is raised and lowered by cam 47 through the medium of a lever 60 having one end pivoted upon a cross shaft 61 journalled as at 62—62 in the cam housing 33 (Figures 4 and 5). A cam roller 63 is journalled upon a stud 64 extending from arm 60 and engages a cam rail 65 forming a part of cam 47 to raise and lower arm 60 periodically. The swinging end of arm 60 extends through casing 33 (Figure 2) and includes a bifurcated yoke 66 having a pair of spaced rollers 67—67 rotatably mounted therein. These rollers are engaged in an annular groove 68, formed by flange 69—69 forming a part of a yoke bearing, generally indicated at 70. The bearing 70 is secured upon a vertical shaft 71 which supports the chuck assembly 25 for vertical reciprocation. In order to provide vertical adjustment of the chuck assembly relative to the stencil, bearing 70 includes a screwthreaded sleeve 73 telescopically engaging shaft 71, with the lower end of the shaft extending through the sleeve as detailed in Figure 9. A set screw 74 passes through the upper end of the sleeve and engages a flat 74a milled in shaft 71 to secure the shaft against rotation with respect to the sleeve and to lock the shaft at adjusted elevation. A knurled thimble 75 is screwthreaded upon the lower end of sleeve 73 and the thimble includes a bottom wall 76 having a bearing ball 77 interposed between wall 76 and the projected end of shaft 71. By rotating thimble 75 therefore, the longitudinal position of shaft 71 relative to sleeve 73 may be varied so as to change the elevation of the chuck assembly with respect to the squeegee and stencil and thus accommodate various ware shapes and sizes.

In order to prevent rotation of the yoke bearing, there is provided a slide bar 78 (Figures 1 and 2) having its upper end secured to a foot 80 forming a part of column 27. The yoke bearing assembly includes a horizontal arm 81 including a slide block 82 slidably engaging the bar 78 to prevent rotation of the yoke bearing 70 as it reciprocates. Since shaft 71 is locked against rotation to bearing 70 by set screw 74, this structure prevents rotation of the chuck assembly.

Figure 7:
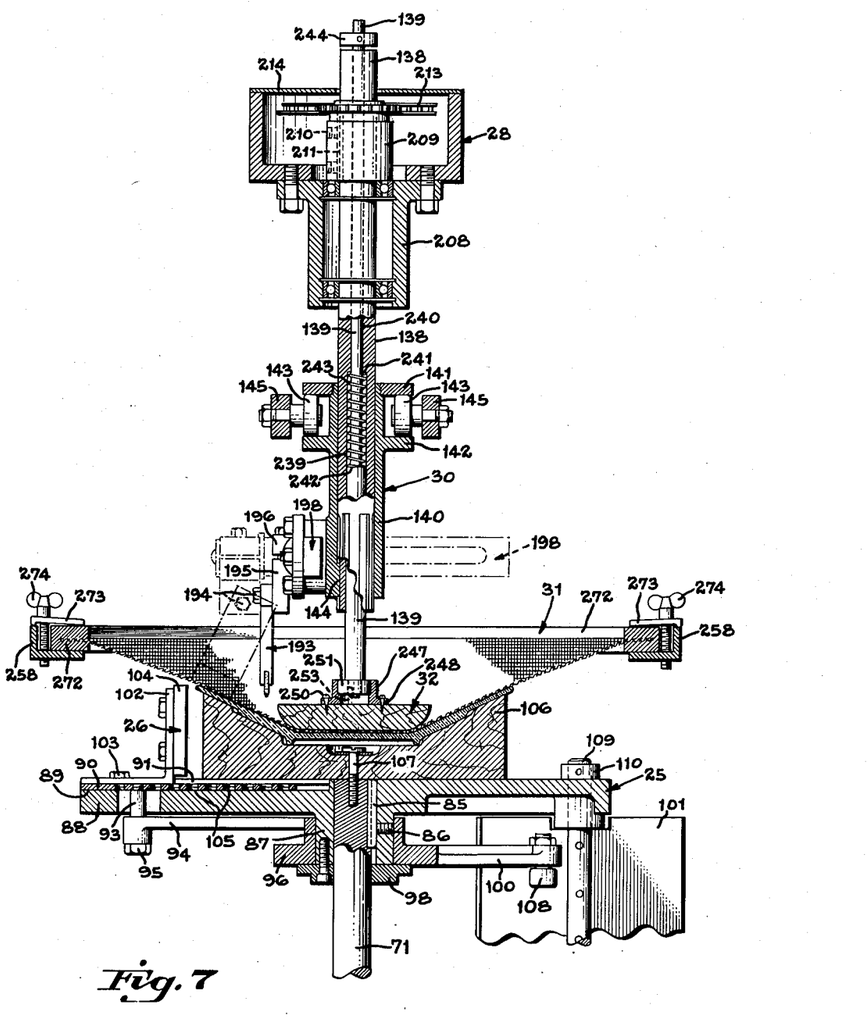
Figure 7 is an enlarged vertical sectional view taken on line 7—7, Figure 3, illustrating the relationship of the parts corresponding to Figure 3, with the ware chuck elevated, the pressure disk and stencil screen in engagement with the ware and illustrating in broken lines the squeegee in wiping engagement with the stencil during its operating cycle.

The upper end of shaft 71 is slidably journalled in a bearing 83 forming a part of foot 80, above noted. The upper end of shaft 71 extends above the bearing 83 to receive the chuck spider 25 which is keyed as at 85 to the end of the shaft and secured longitudinally in position by a set screw 86 passing through the spider hub 87 (Figure 7). Thus, the chuck spider is keyed against rotation upon shaft 71 and shaft 71 is locked against rotation by the radial arm 81 and slide bar 78, so as to resist the turning force developed by actuating the mechanism for jaws 26, as hereinafter disclosed. By operation of cam 47 and lever 60, the chuck spider 25 is elevated to the stencil once during each cycle of operation to permit the operator to place a ware piece upon the chuck to be stencilled and to remove the stencilled ware at the end of the stroke.

Figure 6:
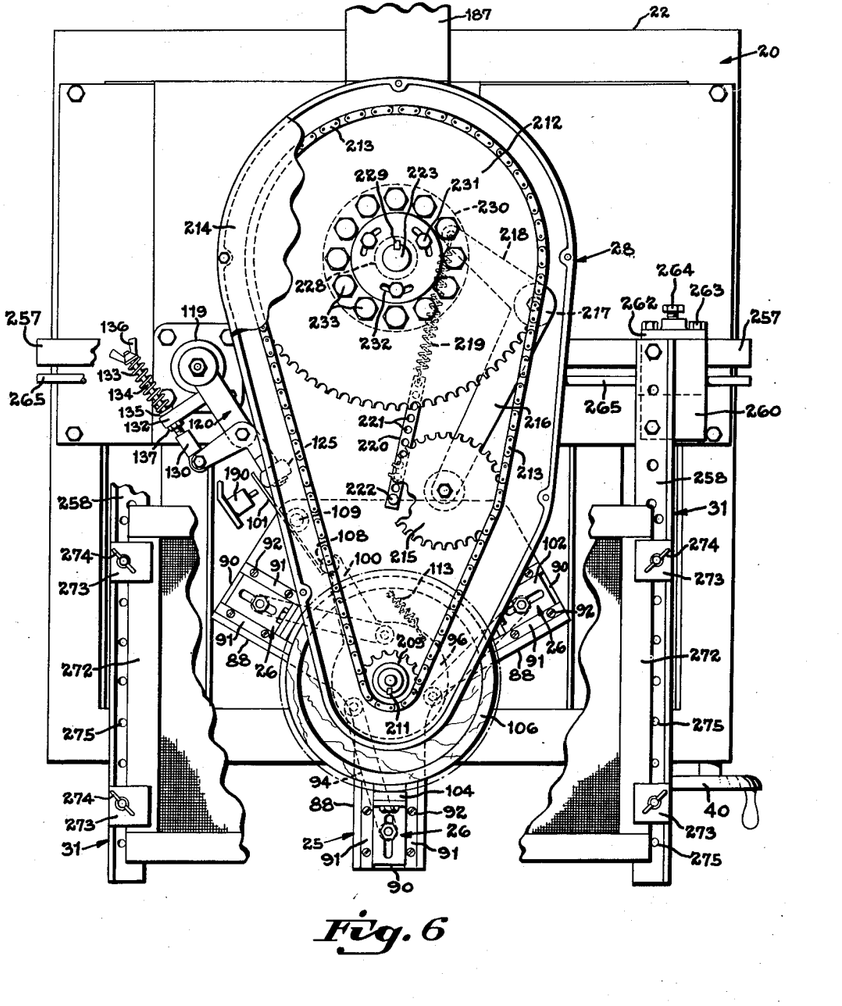
Figure 6 is a fragmentary top plan view of the stencilling machine, illustrating the driving chain and sprockets for transmitting the intermittent drive to the squeegee and the general relationship of the stencil screen, ware chuck and operating linkage for the chuck jaws.

As shown in Figures 6 and 7, the chuck plate or spider 25 is configurated to provide three equally spaced radial arms to slidably support the three centering jaws 26, which move in unison periodically toward and away from each other on radial lines to center the ware. For this purpose each arm 88 includes a groove 89, with the three slots converging toward one another. In each slot there is disposed a block 90 slidably locked in place by the retaining rails 91—91 secured to the arms by screws 92. Each slide block 90 includes a stud 93 extending downwardly through the slot and pivotally connected to the end of a link 94 secured by a nut 95. The links extend at a tangent and their inner ends are pivotally connected to a ring 96 loosely journalled upon a counterturned portion of hub 87. The ring is secured upon the hub by a collar 99 fixed to the hub by one or more set screws. Rotary oscillation of ring 96 shifts the jaws by virtue of the tangential relationship of the links 94. The ring is actuated by an arm 100, forming a part of the ring and the outer end of the arm is engaged against a rock plate 101, to close and open the jaws periodically during the operating cycle of the machine, as hereinafter described.

As shown in Figures 6 and 7, each jaw 26 constitutes an angular bracket 102 secured by screw 103 to its slide 90 and supporting a ware engaging block 104 formed of aluminum or other relatively soft material. It will be noted that the slide 90 is provided with a series of tapped holes 105 so that the position of the jaws with respect to the blocks can be varied to accommodate various ware sizes. As shown in Figure 7, the ware is seated upon a cylindrical ware seat 106 formed preferably of wood and secured by means of a screw 107 passing into the upper end of shaft 71. The diameter of seat 106 is slightly smaller than the diameter of the ware so that the periphery of the ware overhangs the block for engagement by the jaws. The seat is formed preferably from wood or other relatively soft material to prevent chipping of the ware and its upper face is provided with a recess conforming to the shape of the ware so as to provide a firm support against the underside of the ware while it is frictionally engaged by the pressure disk and squeegee.

The jaws are actuated by the rock plate 101 for which purpose the swinging end of arm 100 includes a roller 108 engaged against one side of the plate. The purpose of the plate is to permit the spider 25 to move vertically relative to the base and yet maintain an operating connection with a cam and lever mounted on the base for shifting the jaws. For this purpose, the rock plate 101 includes a shaft 109 having an upper end rotatably mounted in the spider 25, there being provided a thrust collar 110 secured upon the end of the shaft to lock the shaft against endwise displacement for vertical movement of the plate with the spider. The lower end of the shaft extends downwardly as at 111 beyond the lower edge of the plate (Figures 1 and 2) journalled in a slide bearing 112 to permit vertical and rocking movements of the plate. Plate 101 is swung in an arc at timed intervals by means hereinafter disclosed, to swing arm 100 in a direction to draw the tangential links 94 toward each other and thereby draw the clamping jaws together. A tension spring 113 (Figure 6) having one end anchored upon the spider 25 and the opposite end connected to ring 96 returns the arm and jaws to their normal open position after actuation by the pressure plate 101.

Rock plate 101 is actuated to urge the jaws 26 into yieldable clamping engagement with the ware by the cam 46 (Figures 4 and 12) there being provided a roller 114 tracked against the periphery of cam 46, journalled on an arm 115 which is fixed to a vertical shaft 116. Cam 46 includes a lobe 117 arranged to swing arm 115 periodically to the left as viewed in Figure 5 to partially rotate shaft 116. The lower end of shaft 116 is rotatably journalled in a sleeve 118 secured to the top wall of housing 33 having its lower end depending downwardly into the housing and its upper end 119 projecting above the base to provide a support for a yieldable actuating arm assembly 120, arranged to actuate rock plate 101.

Figures 12, 13:
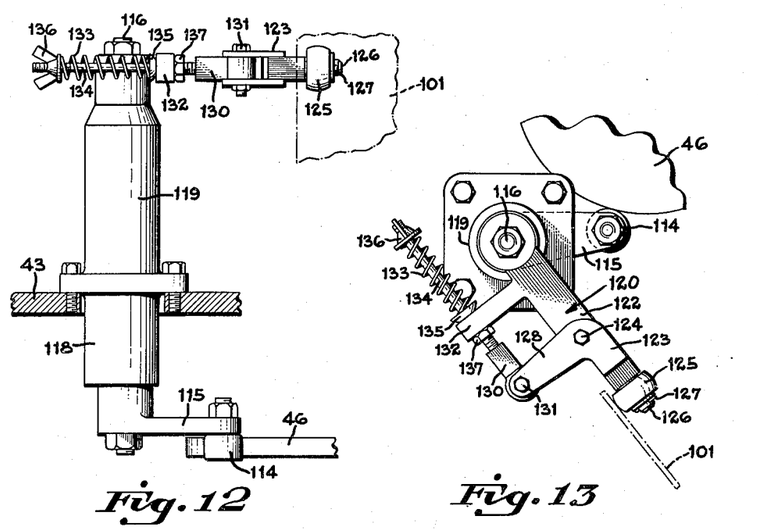
Figure 12 is a fragmentary view partially in section taken on line 12—12, Figure 1, illustrating the yieldable chuck jaw operating lever and the cam and roller by which the lever is actuated.
Figure 13 is a fragmentary top plan view further illustrating the construction of the chuck jaw lever with respect to the cam and rock plate.

As shown in Figures 12 and 13, assembly 120 constitutes an arm 122 keyed upon the upper end of shaft 116 and having a bellcrank lever 123 pivotally mounted by screw 124 upon the swinging end of the arm. One limb of the bellcrank lever extends outwardly in alignment with arm 122 and includes a roller 125 pivotally mounted upon a stud 126, locked in place by a cotter pin 127, the roller being tracked against the plate 101. The other limb 128 of the bellcrank lever extends at right angles and an eye bolt 130 is pivotally connected by a screw 131 to the swinging end of the limb. The eye bolt passes slidably through a bearing block 132 welded or otherwise secured to arm 122 and a spring 133 is located under compression on the shank 134 of the eye bolt. A semi-spherical spring seat 135 engages the bearing block 132 and a wing nut 136 is screwthreaded upon the opposite end of the screwthreaded shank 134 to permit adjustment of the compression spring 133.

The position of the bellcrank lever with respect to arm 122 may be adjusted by means of nut 137, screwthreaded on shank 134 and serving as a stop to locate the bellcrank lever with respect to plate 101.

As shown, the roller 125 is journalled horizontally and tracks against the side of plate 101 so as to facilitate vertical movement of plate 101 relative to the roller. The plate serves as a connecting element between the lever assembly 120 and the arm 100 such that actuating movements of the lever assembly 120 are transmitted to plate 101 causing the plate to swing in an arc against arm 100 to rotate partially the jaw actuating ring 96. The purpose of the bellcrank lever 123 and compression spring 133 is to establish a yieldable connection so that the jaws 26 are yieldably urged into clamping engagement with the ware. When the cam roller 114 rides over the lobe 117 (Figure 5) arms 115 and 122 will swing to the left, rocking the plate 101 by engagement of roller 125 against the plate. The swinging movement of the arm assembly 120 is transmitted through the compression spring 133 such that the arm assembly 120 swings somewhat beyond the distance needed to engage the jaws 26 against the ware. Thus, after engagement by the ware, the jaws 26 remain stationary and the overrunning movement of arm assembly 120 is absorbed by compressing spring 133.

The clamping movement of the jaws occurs during vertical movement of the chuck assembly 25 as can best be seen in Figures 4 and 7. In the position shown, the cam 46 has shifted arm 115 into jaw clamping position and cam 47 has just completed its chuck elevating motion with the ware in pressure engagement against the pressure plate 32 and the squeegee about to descend. It will be seen that the work is centered just prior to engagement by the pressure plate and the lobe 117 will relieve arm 115 upon further rotation of the cam shaft so as to retract the jaws before the squeegee descends to the stencil. By virtue of the rock plate 101, the clamping movement developed by cam 46 is transmitted to the arm assembly 120 and to plate 101 independently of the elevation of chuck. Additionally, the elevation of the chuck assembly may be adjusted to suit the ware without disturbing the connection between the arm assembly 120 and the jaw actuating ring 96.

Squeegee operating mechanism

Immediately after the chuck assembly rises with the ware to its stencilling position (Figure 3) with the ware and stencil engaged by pressure plate 32, the squeegee assembly 30 descends into yieldable engagement with the stencil and ware. As the squeegee descends the jaws 26 retract out of engagement with the ware so as not to interfere with the squeegee as it swings in its orbit to force the pigment through the stencil decorations to the work surface. During this operation, the ware is held frictionally in position upon the wooden chuck block by the spring loaded pressure disk 32 which also stretches the stencil tautly across the ware surface so as to establish contact with the surface to be decorated as shown in Figure 7.

As previously noted, the squeegee arm is raised and lowered by the cam 45 in cam housing 33 and when in contact with the ware, the squeegee is swung through its operating cycle of one revolution by the Geneva arm and gear 48 and 50. It will be noted in Figure 7 that the squeegee assembly is mounted upon a vertical shaft 138 depending downwardly from the outer end of the horizontal arm 28. Shaft 138 constitutes a drive shaft for rotating the squeegee, being connected to the Geneva gear 50 through a sprocket and chain drive as described hereinafter. Since the squeegee assembly is shifted vertically relative to shaft 138, there is provided a splined slidable driving connection between the shaft and the squeegee. Shaft 138 further includes an internal bore to receive in telescopic engagement the spring loaded mounting shaft 139 for pressure disk 32.

Figure 10:
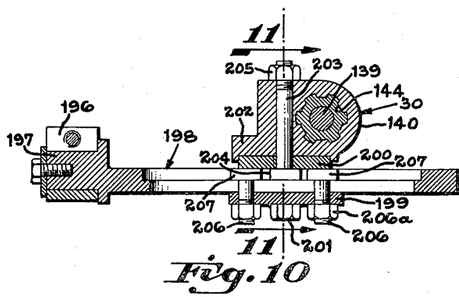
Figure 10 is a sectional view taken on line 10—10, Figure 1, detailing the adjustable mounting structure for the squeegee arm and squeegee relative to the chuck sleeve.

The squeegee assembly constitutes a yoke sleeve 140 splined as at 144 to shaft 138 (Figures 7 and 10). At the top of sleeve 140 there is provided spaced flanges 141 and 142, the two flanges being spaced apart to receive the rollers 143—143 of a yoke 145. This yoke forms a part of a squeegee lifter assembly indicated generally at 146, which constitutes a yieldable beam pivoted near its center upon a cross shaft 147 carried by a bracket 148 depending from the underside of arm 28. The rearward end of beam assembly 146 is pivotally connected by a pivot pin 150 to a clevis 151 secured to the upper end of a push rod 152. The lower end of the push rod extends into the cam casing 33 and is connected to an actuating lever 153 by a bearing block 154 pivotally connected by screw 155 to a cam lever 153 (Figures 4 and 5). The opposite end of lever 153 is secured by set screws 156 to a shaft 157 having its opposite ends journalled in bearings 158—158 mounted in the walls of the cam casing 33. A cam roller 160 is journalled upon a shoulder screw 161, threaded into lever 153 intermediate the length of the lever, the roller being tracked upon the operating rail 162 of cam 45. Lever 153 is drawn upwardly to engage roller 160 against the cam by means of a tension spring 163 having its upper end anchored upon a stud 164 threaded into the wall of the casing and its lower end hooked to a clip 165 mounted upon the pin 166 passing into the outer end of lever 153.

It will be apparent that as cam 45 rotates, lever 153 will be raised and lowered according to the contour of the cam rail 162. This movement is transmitted by pull rod 152 to the rearward end of squeegee beam assembly 146, causing the squeegee assembly to be raised and lowered. The raising movement of the squeegee and arm is positive since this motion is developed by the cam and roller and transmitted in tension through the rod 152 to the lifter arm 146. The downward stroke of the arm is spring urged by virtue of tension spring 163 and also by reason of the fact that the swinging forward end of the arm overbalances the rearward end tending to swing the arm downwardly by gravity.

In order to control the pressure engagement of the squeegee with the stencil and ware, beam assembly 146 is articulated and is provided with an adjustable spring assembly 167 toward its forward end, joining the articulated sections yieldably together. Described in detail with reference to Figures 2, 3 and 8, arm 146 constitutes an outer frame 168 having a relatively narrow lug 170 at its rearward end for pivotally connecting the bifurcated clevis 150 to the frame. The intermediate portion of the frame is pivotally connected to the bracket 148 previously noted, and the forward end of the arm is provided with a cross plate 171 to which is pivotally connected as at 172, the eye of an elongated eye bolt 173. Eye bolt 173 rises vertically and its upper end includes a knurled thumb screw 174 adjustably screwthreaded thereon providing a seat for a spring 175 maintained in compression between nut 174 and the yoke arm 176 which fits within frame 168. The rearward end of yoke arm 176 is pivotally mounted upon the cross shaft 147 and its forward end includes the yoke 145, connected to the yoke sleeve 140.

Figure 3:
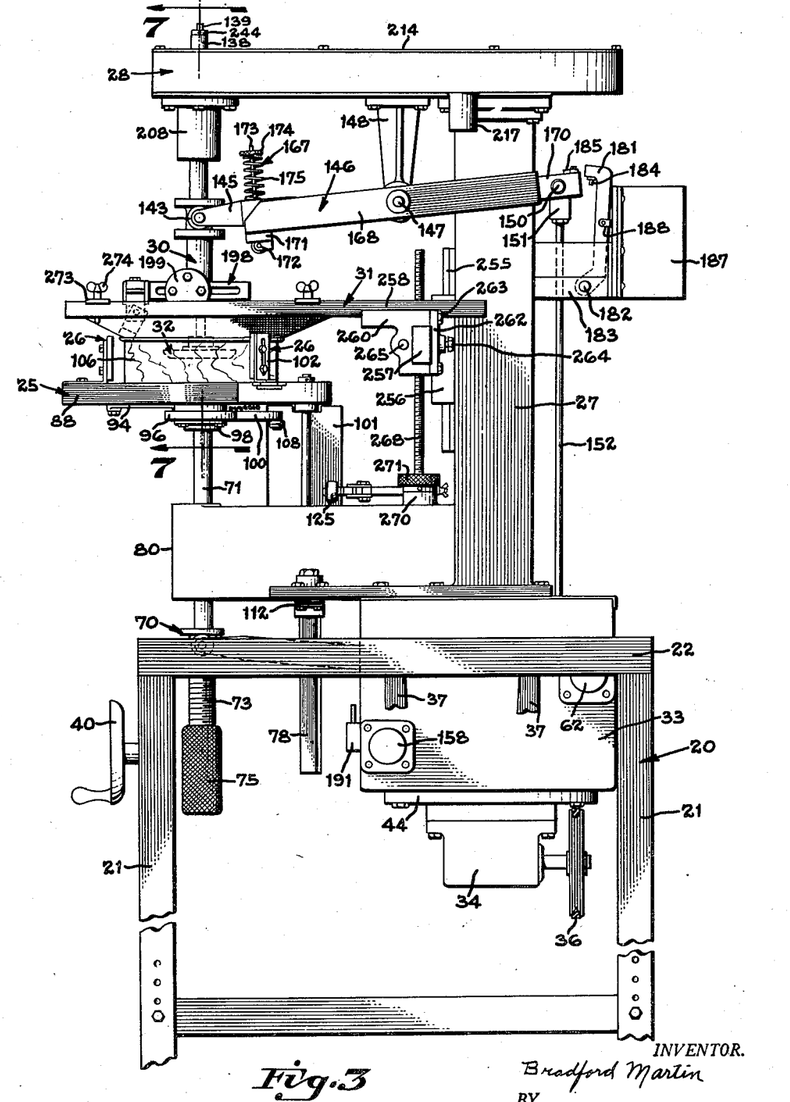
Figure 3 is a side elevation similar to Figure 2, but showing the position of the parts during a stencilling operation with the chuck and ware elevated to the stencil screen, the squeegee interlock latch in a normal inoperative position and the squeegee arm lowered to place the squeegee against the stencil.
Figure 8:
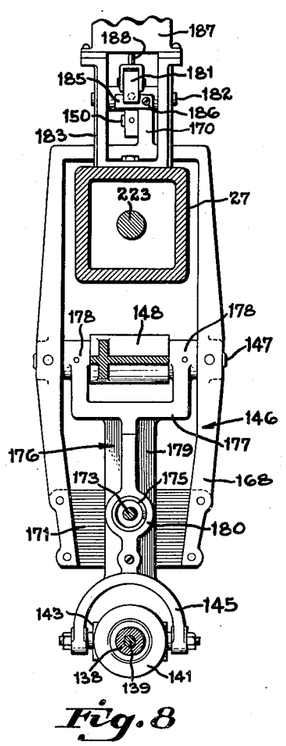
Figure 8 is a sectional view taken on line 8—8, Figure 2, detailing the construction of the yieldable beam for raising and lowering the squeegee.

As best shown in Figure 8, the inner end of the yoke arm 176 constitutes a fork 177 including spaced bearings 178—178 journalled upon cross shaft 147, the arm fitting within the outer frame 168 to center the yoke arm relative to the frame. The forward yoke 142 is joined to the rearward fork 177 by a web 179 provided with a receptacle 180 providing a seat for the lower end of spring 175 and including central aperture for passage of the eye bolt 173. When the squeegee engages the ware at its lower limit of travel, as shown in Figure 3, the yoke arm 176 is held stationary and the arm frame 168 continues its stroke thereby compressing the spring 175 as indicated. The pressure of the squeegee upon the stencil is controlled by the spring 175 and squeegee pressure can be regulated by adjusting the nut 174 in the appropriate direction.

In order to prevent the squeegee from descending in pressure engagement upon the stencil screen, when a ware piece is omitted from the chuck, an electrically operated safety device is provided. As shown in Figures 3 and 8, the safety device constitutes an arm 181 pivotally mounted as at 182 upon a bracket 183 secured to the rear side of column 27. The upper swinging end of arm 181 includes a stud 184 engageable with a stop plate 185 secured by screws 186 to the lug 170 of outer frame 168. In the position shown in Figure 2, the lug is engaged by the arm to maintain the arm and squeegee assembly in elevated position. The arm is moved to an inoperative position as shown in Figure 3 by a solenoid enclosed in casing 187, also secured upon bracket 183 and connected by a link 188 to the solenoid armature. The solenoid is energized by a limit switch 190 mounted in a position to be actuated by the rock plate 101 when the plate swings beyond a predetermined position when a ware piece is omitted from the chuck. A recycling switch 191, mounted in operating relationship with the chuck elevating arm 60 (Figures 2 and 3) also is interconnected in the circuit as hereinafter described with reference to the circuit diagram of Figure 14. The circuit is such that the safety arm 181 swings to an operating position to prevent descent of the squeegee when the ware is omitted from the chuck and the switch 191 retracts the safety arm 181 to permit normal operation on a succeeding cycle with the ware in the chuck.

As shown in Figure 7, the squeegee 193 is a conventional structure constituting a flat plate of wood or similar material with a resilient working edge formed of rubber or similar material bevelled for contact with the stencil screen. The pigment is contained upon the upper surface of the screen and the squeegee edge contacts the screen and sweeps over its surface, forcing the pigment through the stencil decorations for deposit upon the ware in the customary fashion.

Figure 11:
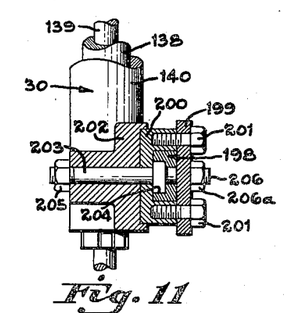
Figure 11 is a sectional view taken on line 11—11, Figure 10, further detailing the adjustable mounting of the squeegee arm with respect to the chuck sleeve upon which it is mounted.

The squeegee 193 is mounted by a screw 194 to a mounting plate 195 in a manner to permit the squeegee to be adjusted to the angle of the ware face. Mounting plate 195 includes a clamp unit 196 engaged upon stud 197 forming a part of a slotted arm 198 (Figures 10 and 11). Arm 198 is secured to the lower end of the chuck sleeve 140 between an outer disk 199 and an inner disk 200. These disks are slotted to provide a passageway to receive the arm 198 when placed face to face as shown, and disk 199 is secured to disk 200 by screws 201 passing through disk 199 and threaded into disk 200. Disk 200 is frictionally engaged against a recessed hub 202 forming an integral part of the yoke sleeve 140 and is clamped against the hub by a screw 203 having a square head nested within the slot 204 of arm 198. The outer end of screw 203 includes a nut 205 which may be loosened to unclamp the disk assembly with respect to the hub 202 and thus adjust the angle of arm 198. Arm 198 is secured to disk 199 by screws 206 which include square heads 207 seated against the arm with the shank of the screws passing through the arm slot 204 and projecting through the outer surface of disk 199. Nuts 206a clamp the arm to the disk and these can be loosened to permit the arm to be adjusted longitudinally, thus regulating the radius of squeegee rotation. These adjustments provide universal adjustment of the squeegee so that the assembly may be adjusted conveniently to accommodate various sizes and shapes of ware pieces. The screw 194 for mounting the squeegee unit 193 may provide a regulated amount of looseness to permit the squeegee to adjust itself relative to the work surface, following the customary practice.

Squeegee drive

The squeegee is rotated by virtue of the splined connection between shaft 138 and yoke arm 140 as previously noted. The upper end of shaft 138 is journalled in a bearing sleeve 208 secured upon the lower surface of the arm 28, the shaft being secured to the hub of sprocket 209 by set screws 210 and key 211 (Figures 6 and 7). Vertical displacement of the shaft is prevented by virtue of the bearing engagement of the sprocket hub with the sleeve. Sprocket 209 is in driving connection with a large sprocket 212 by a sprocket chain 213. As shown, the arm 28 is in the form of a housing to enclose the sprocket and chain drive, the top of the housing being closed by means of a cover plate 214 to exclude dirt and dust. Slack in chain 213 is taken up by an idler sprocket 215 journalled upon the swinging end of an arm 216, the rearward end of which is pivotally mounted upon a stud 217 mounted in the lower wall of the arm 28. The arm 216 constitutes a bellcrank lever provided with an angular limb 218 to which is connected a spring 219 having its opposite end anchored to a clip 220. The clip is provided with a series of apertures 221 for engagement over a pin 222 whereby the tension of spring 219 may be varied to regulate chain tension.

The large sprocket 212 is fixed upon the upper end of a vertical shaft 223 which extends downwardly through the hollow vertical column 27. The lower end of shaft 223 extends into cam housing 33 and is keyed as at 224 to the Geneva gear 50 (Figures 4 and 5). The lower end of shaft 223 is journalled in a bearing 225 mounted upon the top wall of the cam housing and the upper end of the shaft is journalled in a similar bearing 226 mounted in the arm 28. According to the structure disclosed, the Geneva gear makes one-sixth of a revolution for each complete revolution of the Geneva arm 48, there being provided six slots 227 in the gear. In order to provide one complete turn of the squeegee around the ware per cycle, the ratio between small sprocket 209 and large sprocket 212 is six to one, therefore for each intermittent advancement of the Geneva gear the squeegee makes one complete turn around the circumference of the ware.

In order to adjust the squeegee radially to starting position relative to the stencil, the large sprocket 212 is keyed to shaft 223 through a tapered sleeve 228 keyed as at 229 to the upper end of the shaft and frictionally engaged in the tapered bore of a driving disk 230 to which the sprocket is attached. This arrangement follows the structure disclosed with reference to the mounting of the cams upon the shaft, the sleeve 228 being connected to the driving disk 230 by screws 231 passing through arcuate slots 232 formed in the top flange of sleeve 228 and threaded into disk 230. The sprocket is secured to the driving disk 230 by means of screws 233 passing through the sprocket into the disk.

As shown in Figures 4 and 5, the cams and Geneva movement are in a position corresponding to the position of the parts in Figures 3 and 7. Thus, the chuck assembly is elevated to stencilling position by cam 47, the clamping jaws closed by cam 46 to center the ware, and the squeegee assembly has been lowered by cam 45. It will be observed that lobe 117 is about to retract the clamping jaws 26 and that the roller 236 of arm 49 is just beginning to enter one of the slots 227 of the Geneva gear. Before movement is imparted to the Geneva gear, the clamping jaws will have been retracted to a position out of engagement with the edge of the ware to permit free passage of the squeegee. The actuating faces of cams 45 and 47 are proportioned to maintain the squeegee in its lowered position during the stencilling swing of the squeegee and the chuck cam 47 maintains the chuck in operative position for substantially the same period of time. At completion of the stencilling sweep the squeegee assembly will be elevated and the chuck assembly lowered to the position shown in Figures 1 and 2 with the chuck jaws retracted and ready for the next cycle of operation.

The spring loaded pressure plate 32 is rotatably mounted upon the lower end of the shaft 139 which is slidably engaged in a bore extending through the squeegee drive shaft 138. The lower end 239 of the bore is larger in diameter than the upper end 240, providing a shoulder 241. Shaft 139 is counterturned to fit the upper and lower bores 239 and 240, providing a shoulder 242. A spring 243 is maintained in compression between shoulders 241 and 242 to urge the shaft downwardly. The upper end of shaft 139 extends beyond the top of shaft 138 and is provided with a stop collar 244 to maintain the spring loaded shaft against downward displacement.

The pressure disk 32 is formed preferably from wood or other relatively soft material and is mounted upon the lower end of shaft 139 by means of a collar 247 having a flange 248 for attachment by screws 250 to the disk. The collar 247 is bored to establish a press fit with the outer race of a ballbearing 251, the inner race of the bearing being pressed upon the counterturned lower end 253 of the shaft. This arrangement permits the pressure plate to rotate freely relative to the shaft.

*Stencil mounting*

In order to accommodate the various ware shapes, the stencil is adjustably mounted so that it may be adjusted horizontally and vertically with respect to the ware. As shown in Figures 1, 2 and 6, the stencil assembly is mounted for vertical movement upon a slideway 255 secured to the front of column 27. A slide block 256 is mounted for vertical movement relative to the slideway and a cross bar 257 is secured to the slide block. The stencil unit 31 is mounted upon a pair of horizontally disposed angle irons 258—258 having their inner ends mounted upon slide blocks 260 which slidably engage upon the cross bar 257 on opposite sides of block 256. The blocks 260 each have a slot embracing the bar 257 covered by a plate 262 secured by screws 263. Each plate includes a set screw 264 arranged to frictionally clamp the block to the bar. The blocks and angle irons are shiftable laterally upon the cross bar 257 so as to accommodate various sizes of squeegee frames and are shiftable unitarily to permit shifting of the squeegee horizontally with respect to the ware. For this purpose, there is provided a rod 265 parallel with cross bar 257, with its opposite ends passing slidably through holes bored in the slide blocks 260. The respective blocks are secured to the rod by means of set screws 267. By loosening the screws 264, with the set screws 267 tight, the entire stencil unit can be shifted laterally. On the other hand, the set screws 267 may be loosened to shift the blocks individually relative to each other to accommodate the stencil.

The assembly is adjusted vertically by means of a screw shaft 268 in threaded engagement with cross bar 257 and having its lower end rotatably mounted in a boss 270 formed in the foot 80 of the column. The screw shaft 268 includes a knurled knob 271 keyed against rotation upon the shaft to permit convenient rotation of the shaft by hand.

The stencil may follow any desired construction and is disclosed in the form of a rectangular frame 272 having a stencil screen marginally secured to the frame (Figures 6 and 7). The frame is secured to the angle iron arms 258 by means of clamp members 273, in the form of flat plates having one edge resting upon the edge of the angle irons and the opposite edge resting upon frame 272. The clamping elements are secured in clamping engagement with the frame by means of wing screws 274, the lower ends of which are in threaded engagement with one of a series of holes 275 tapped in the angle irons.

By virtue of the universal adjustability of the stencil relative to the ware, the machine can be set up for accurate stencil registration and by operation of the centering jaws 26, each successive ware piece is brought into accurate registry with the stencil decorations. This permits the machine to be run at a high production rate to produce work of a uniform high standard of quality. The use of the wood pressure plate 32 and chuck block 106 prevents ware chipping and breakage and simplifies the operation of adapting the machine for different classes of work since these parts can be turned readily to size on a lathe according to requirements and installed conveniently on the machine. The vertical adjustment screw 268 controls the elevation of the stencil screen relative to the ware so that the pressure of the screen against the ware can be regulated. A further vertical adjustment is provided by the thimble 75 for the chuck assembly, which changes the elevation of the chuck or the relationship of chuck stroke to pressure plate 32. This adjustment may be utilized to adapt the machine to the depth of work and the degree of pressure with which the ware is pressed against the pressure plate 32. It will be observed also that in converting the machine from relatively flat ware such as dinner plates to deeper ware such as soup plates, it may be necessary to provide a higher chuck block and decrease the top stroke limit of the chuck to compensate for the change in depth. It is also to be noted that the squeegees can be of any required contour as required by the configuration of various ware surfaces.

Safety interlock

Since the machine is of the continuous automatic type, it will continue to run through its cycle of operation whether or not a ware piece is placed in the chuck. The safety interlock prevents the squeegee assembly from descending to the stencil screen to prevent smudging or damage as above noted, should the operator fail to feed a ware piece to the chuck at the beginning of the cycle. As described with reference to the squeegee operation, there is provided a safety arm 181 pivotally mounted on the column and engageable with the squeegee arm to latch the arm in an inoperative position when the ware is omitted from the chuck jaws.

As previously described, the normally open limit switch 190 is mounted adjacent the rock plate 101 such that when the jaws are engaged against the ware the movement of plate 101 is not sufficient to close switch 190 but when the ware is omitted the plate will swing sufficiently to close the switch. Referring to the electrical diagram of Figure 14, switch 190 is interconnected in a control circuit arranged to energize a solenoid 276 to swing arm 181 to latching position when the solenoid is energized. The circuit includes a pair of power lines 277—278 connected to the drive motor 35 through a switch box 279 which follows standard construction and therefore is not disclosed in detail. The switch box includes the usual "start" and "stop" buttons and relays to control motor operation.

Figure 14:
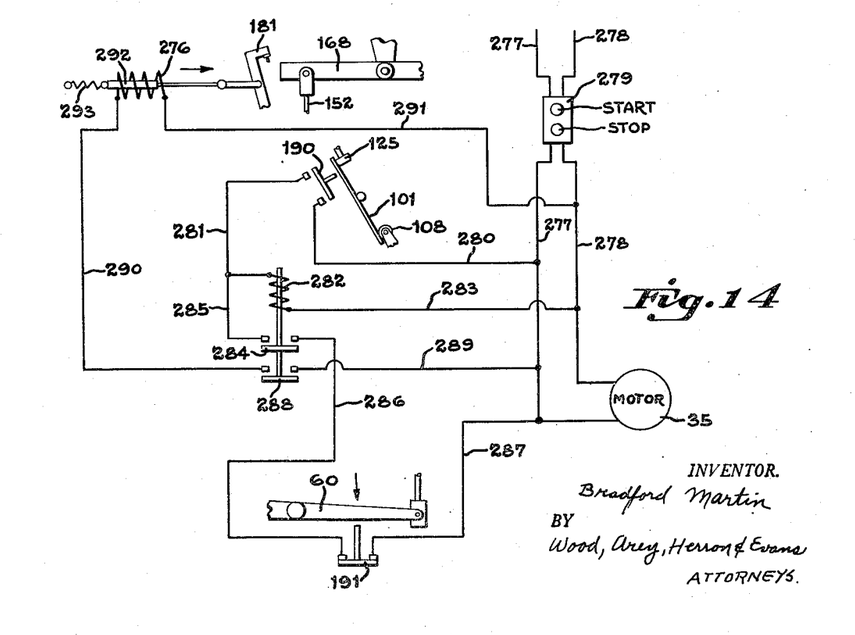
Figure 14 is a diagrammatic view illustrating the electrical circuit for operating the squeegee interlock.

A branch line 280 extends from line 277 to one of the contacts of switch 190 and a branch line 281 extends from the other contact to the winding of a control relay 282. The opposite end of the relay winding is connected to the power line 278 by branch line 283, thus completing the relay circuit when switch 190 is closed. The relay is provided with a normally open contactor 284 to establish a holding circuit to lock the relay in energized position since switch 190 is closed only momentarily when a work piece is omitted and the jaws 26 closed and it is necessary to keep relay 282 energized until the end of the cycle. The holding contactor 284 closes the contacts of branch lines 285 and 286 to complete the holding circuit through the normally closed recycling switch 191 which is opened at the end of the cycle by the chuck lifter arm 60. The holding circuit is completed by the branch line 287 leading to power line 277. Solenoid 282 includes a second contactor 288 to complete the circuit from power line 277, through branch line 289, through contactor 288, branch line 290 to the winding of solenoid 276. The circuit is completed through the opposite end of the solenoid winding by a branch line 291 leading to the power line 278. When the winding of solenoid 276 is energized, the solenoid armature 292 is pulled to the right as indicated by the arrow, against the tension spring 293 causing the interlock arm 181 to be swung to an operating position with respect to the end of the squeegee elevating arm.

From the foregoing, it will be observed that momentary closing of switch 190 will energize solenoid 282 and that the solenoid will be locked in closed position by the holding circuit established by contactor 284 and a circuit established to the solenoid 276 to prevent the squeegee arm from descending for that particular stencilling operation. However, when the cycle is completed and the chuck arm descends to its lower limit, normally closed switch 191 will be opened momentarily to deenergize the holding circuit through contactor 284, causing the relay to be deenergized, whereupon contactor 288 will open to deenergize solenoid 276. When this occurs the safety arm will be retracted to its inoperative position by tension spring 293 so that the stencil arm may descend if a ware piece is placed on the chuck. If a ware piece is omitted at the next cycle, switch 190 again will be closed to latch the squeegee assembly in elevated position before it begins its descent.

Having described my invention, I claim:

1. A machine for stencil decorating ware pieces comprising; a stationary stencil screen, a rotary squeegee disposed above the screen and movable vertically relative to the screen, a vertically movable chuck disposed beneath the stencil screen and adapted to elevate a ware piece into printing engagement with the screen, a cam and lever connected to the squeegee to raise and lower the same with respect to the screen, a cam and lever connected to the chuck for raising and lowering the same, said cams mounted upon a cam shaft for unitary rotation, an intermittent gear driving arm fixed to said cam shaft, an intermittent gear mounted adjacent said arm and adapted to be rotated partially upon each rotation of the cam shaft, and transmission means connecting the intermittent gear to the squeegee and adapted to swing the squeegee through an arc of rotation for each partial rotation of the intermittent gear when the ware and squeegee are engaged against the stencil.

2. An automatic machine for stencil decorating ware pieces comprising; a stationary stencil screen, a rotary squeegee disposed above the screen and movable vertically relative to the screen, a vertically movable chuck disposed beneath the stencil screen and adapted to elevate a ware piece into printing engagement with the screen, movable jaws on said chuck for centering the ware pieces, a cam and lever connected to the squeegee to raise and lower the same with respect to the screen, a cam and lever connected to the chuck for raising and lowering the same, a cam and lever connected to the chuck jaws for actuating the jaws, said cams mounted upon a common cam shaft for unitary rotation to actuate the squeegee, chuck and chuck jaws in synchronism with one another, an intermittent gear driving arm fixed to said cam shaft, an intermittent gear mounted adjacent said arm and adapted to be rotated partially upon each rotation of the cam shaft and transmission means connecting the intermittent gear to the squeegee and adapted to swing the squeegee through a cycle of rotation for each partial rotation of the intermittent gear when the ware and squeegee are engaged against the stencil with the chuck jaws in retracted position.

3. A stencil decorating machine comprising; a stationary stencil screen, a squeegee disposed on one side of said screen, a ware supporting chuck disposed upon the opposite side of the screen, actuating means for moving the chuck and ware into and out of engagement with the screen, means operative in timed relation with the movement of the chuck for moving the squeegee into engagement with the screen after the ware piece is postioned by the chuck against the screen, a ware responsive switch arranged to be actuated by the chuck, a latching device adapted to latch the squeegee out of engagement with the stencil screen unless a ware piece is interposed between the chuck and screen, a control circuit in electrical connection between the ware responsive switch and latching device, and a recycling switch connected in the circuit and arranged to be actuated periodically by the ware chuck actuating means, the control circuit being arranged to maintain the latching device in latching engagement with the squeegee until the recycling switch is actuated by said means at the end of the cycle.

4. In a stencil decorating machine having a base, a stationary stencil screen, a rotary squeegee engageable with the screen and a ware chuck movable vertically relative to the base for engaging the ware against the stencil screen, means for centering a ware piece upon said chuck comprising; a plurality of centering jaws movably mounted upon the chuck, a rotatable member carried by the chuck connected in common to the jaws and operable to move the jaws toward or away from the ware, a pivotally mounted rock plate movable vertically with the chuck and in operative connection with the said rotary member, an actuating lever having a portion tracked against said plate to actuate the plate and jaws regardless of the position of the chuck, and means for actuating said lever in timed relationship with the vertical movements of the chuck and rock plate.

5. In a stencil decorating machine having a base, a stationary stencil screen, a rotary squeegee engageable with the screen and a ware chuck movable vertically relative to the base, for engaging the ware against the opposite side of the stencil screen, means for centering a ware piece upon said chuck comprising; a plurality of centering jaws slidably mounted upon the chuck, a jaw actuating ring rotatably mounted upon the axis of the chuck, a plurality of links each extending at a tangent from the ring to one of said jaws, the ends of the links being pivotally connected to the ring and one of the jaws, an arm extending from the jaw actuating ring, a pivotally mounted rock plate movable vertically with the chuck, the end of said arm being in operative contact with said rock plate, a pivotally mounted actuating lever having yieldable engagement with the rock plate to actuate the plate and jaws regardless of the position of the chuck, means for actuating said lever in timed relationship with the vertical movements of the chuck and rock plate.

6. A stencil decorating machine having a stationary stencil screen, a vertically movable rotary squeegee engageable with the screen, a ware chuck for engaging the ware with the opposite side of the stencil screen, a plurality of centering jaws slidably mounted upon the chuck, an actuating lever pivotally mounted on the base of the machine, means connecting the lever to the centering jaws for actuating the jaws, means for actuating said lever in timed relationship with the vertical movements of the squeegee, yieldable means interposed in said lever whereby the ware piece is centered by a yieldable engagement with the centering jaws, an electrical contact element, an electrically operated interlock device connected to the contact element, the interlock device being operable to lock the squeegee out of engagement with the screen, said contact element being associated with the centering jaws and adapted to actuate the interlock device when a ware piece is omitted from the chuck and the jaws move toward each other beyond a normal ware engaging position.

7. A stencil decorating machine having a base, a stationary stencil screen, a rotary squeegee engageable with the screen, actuating means for elevating and lowering the squeegee with respect to the screen, a ware chuck movable vertically relative to the base for engaging the ware against the stencil screen, a plurality of centering jaws slidably mounted upon the chuck and adapted to center a ware piece on the chuck, a pivotally mounted element on the chuck operable to move the jaws toward or away from the ware, actuating means on the base of the machine arranged to actuate the pivotally mounted member on the chuck in timed relationship with the vertical movements of the squeegee, an electrical switch mounted in operating relationship with the pivotally mounted element on the chuck and adapted to be closed unless a ware piece is interposed between the jaws, an interlock device in electrical connection with said switch, the interlock device being adapted to latch the squeegee in an elevated position when the switch is closed to prevent the squeegee from contacting the screen when a ware piece is omitted from the chuck.

BRADFORD MARTIN.

REFERENCES CITED

The following references are of record in the file of this patent:

UNITED STATES PATENTS

| Number | Name | Date |
|---|---|---|
| 1,189,121 | Kaefer | June 27, 1916 |
| 2,124,011 | Smith | July 19, 1938 |
| 2,261,255 | Jackson | Nov. 4, 1941 |
| 2,437,224 | Emerson | Mar. 2, 1948 |
| 2,492,052 | Martin | Dec. 20, 1949 |